United States Patent [19]

Zukerman

[11] 4,022,915

[45] May 10, 1977

[54] INTERMEDIATE MOISTURE FOOD PRODUCT AND METHOD OF PREPARING THE SAME

[75] Inventor: Harold Zukerman, Skokie, Ill.

[73] Assignee: National Can Corporation, Chicago, Ill.

[22] Filed: June 28, 1976

[21] Appl. No.: 700,611

[52] U.S. Cl. .................................. 426/72; 426/92; 426/99; 426/250; 426/635; 426/657; 426/518; 426/805

[51] Int. Cl.$^2$ .......................................... A23K 1/00

[58] Field of Search ............ 426/92, 635, 332, 805, 426/264, 265, 266, 331, 532, 99, 103, 656, 657, 72, 250, 518, 307

[56] References Cited

UNITED STATES PATENTS

| | | | |
|---|---|---|---|
| 3,482,985 | 12/1969 | Burgess et al. | 426/805 |
| 3,615,652 | 10/1971 | Burgess et al. | 426/805 |
| 3,653,908 | 4/1972 | Buck et al. | 426/805 |
| 3,745,021 | 7/1973 | Van Middlesworth et al. | 426/805 |

Primary Examiner—Jeanette M. Hunter
Attorney, Agent, or Firm—Neuman, Williams, Anderson & Olson

[57] ABSTRACT

A method of producing an expanded intermediate moisture food product having a moisture content between about 20 and 30 percent by weight, a protein content of between about 15 and 35 percent by weight, and a water activity between about 0.80 and 0.85 that has an extended shelf life without refrigeration is provided, comprising admixing a dry granular cereal grain, dry protein source material, together with other powdered and granular materials, a polyhydroxy alcohol bacteriostatic agent and an antimycotic compound to produce a homogeneous blend; passing said admixture in a confined stream through a pre-cooking zone and subjecting it to treatment with steam, hot water and agitation to produce a hot, granular blend having a moisture content of about 25 percent and a temperature of about 190° F.; passing the wet blend into a compression and extrusion zone wherein the blend is subjected to temperatures above the boiling point of water for a time sufficient to cook the admixture while maintaining the admixture under superatmospheric pressures; extruding the fused cooked admixture through a die into a zone of reduced pressure to form a continuous stream of expanded cooked product; continuously dividing the expanded cooked product into discrete pellets of uniform shape; passing the pellets to a cooling zone and subjecting the pellets to a spray of cold air and water until their temperature is reduced to 100° F., or less, and the moisture content of the pellets is raised to a predetermined level; and coating the cooled pellets with liquefied fat.

19 Claims, 1 Drawing Figure

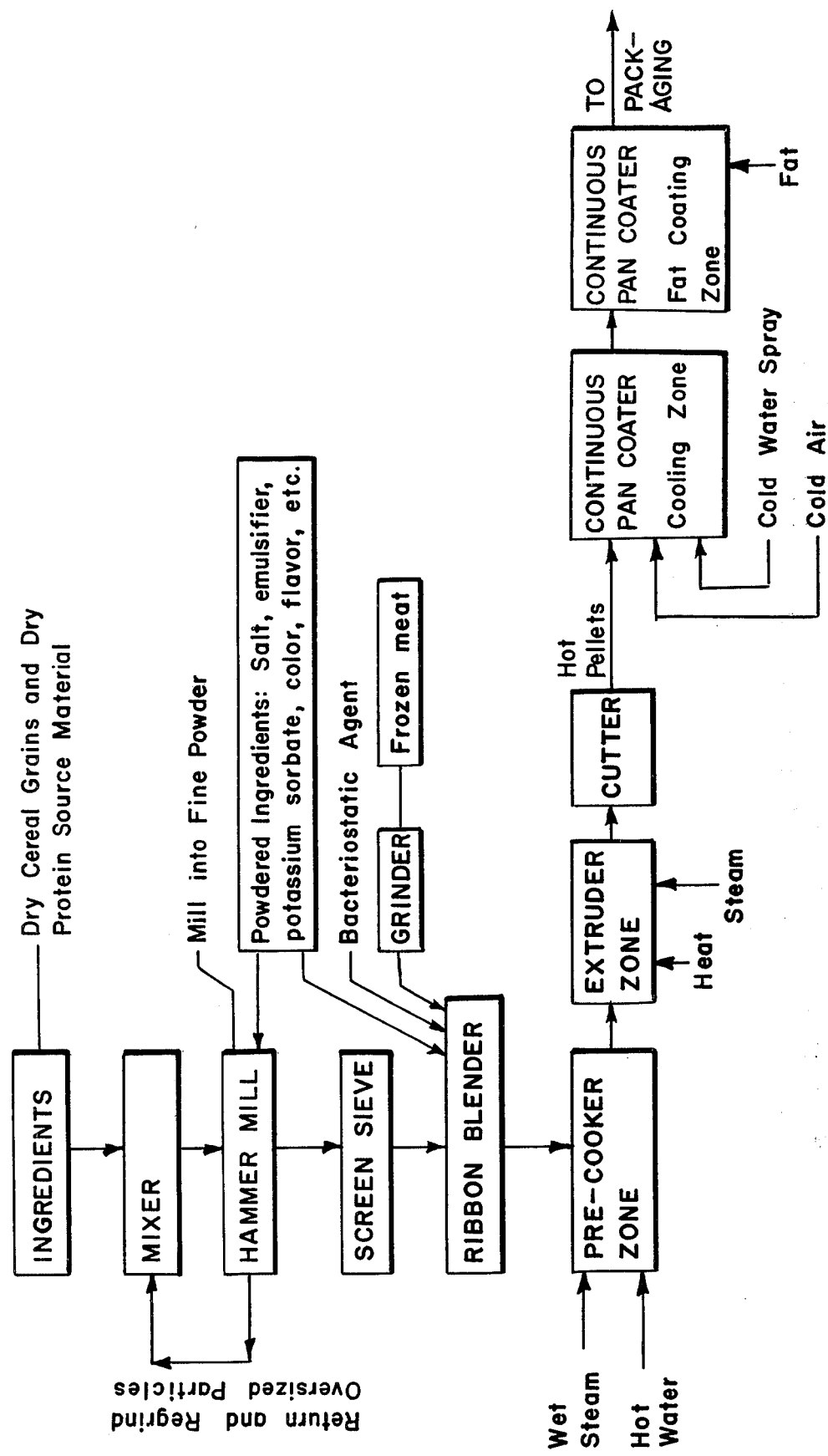

INTERMEDIATE MOISTURE FOOD PRODUCT AND METHOD OF PREPARING THE SAME

BACKGROUND OF THE INVENTION

1. Field of the Invention

This invention relates to the formation of shelf-stable food products from protein source materials, and more particularly, relates to a process for producing an intermediate moisture food product.

2. Description of the Prior Art

During recent years, extensive research and development efforts have been applied toward the development of meat-like or meat simulating food materials prepared from secondary protein sources, particularly protein-containing vegetable substances. Such materials desirably present the appearance, texture, taste and apparent moist eating quality of meat and meat-type foods.

Among such materials are those known as intermediate moisture food products, that is, those having a moisture content in excess of 10% and substantially below 75%. These materials result from the processing of protein-containing vegetable materials, and they exhibit a resemblance to actual meat in appearance, texture, and chewing and mouth feel characteristics. These materials have been found particularly acceptable for use as an animal food in that they demonstrate a high degree of palatability such that the animal receives them favorably.

A variety of processes for producing such intermediate moisture food products is known to the art. Loepiktie, et al., U.S. Pat. No. 3,759,715, disclose a process comprising the preparation of a dough from secondary protein source materials such as vegetable source materials having at least 30% protein and an aqueous liquid containing various humectants and preservative solvent materials. The dough is thereafter subjected to a mechanical tempering operation, followed by controlled, unidirectional expansion, placing the dough in a tube unconfined at the ends, and subjecting the tube to elevated temperature and pressure to heat-set the protein.

Van Middlesworth, et al., U.S. Pat. No. 3,745,021, discloses an expanded, shelf-stable food product comprising meat, a farinaceous component, water, and water soluble solutes, including sugar. The product is produced by combining the ingredients and heating to cause partial gelatinization. The soluble bacteriostatic components are then added and the resulting mix is then subjected to extrusion at elevated temperature and pressure to form an expanded "rope", which is then cut to form chunks of the product.

Burkwall, Jr., U.S. Pat. No. 3,759,714, discloses a high flavor proteinaceous food product comprising flavoring agent, sugar or equivalents, pregelatinized starch, a high protein binding agent, and sufficient water to give a final moisture content of from 20–40% by weight. The product is produced by mixing all of the above constituents, heating the mixture to a temperature below the boiling point of water and thereafter extruding the heated mixture into small strands.

Yang, et al., U.S. Pat. No. 3,814,823, disclose a process of forming a meat-like, protein-containing product having unidirectional parallel fiber structure produced by stretching.

Hayes, et al., U.S. Pat. No. 3,886,298, disclose the preparation of expanded texturized protein products which have a fibrous aligned meat-like appearance. Buck, et al., U.S. Pat. No 3,653,908, disclose the preparation of an animal food product containing stabilizing solutes, including sugar, salt and acidulants to provide bacteriostasis which is heated and extruded.

The prior art, then, discloses a number of processes for producing an intermediate moisture food product which, however, require expensive, special operative steps; result in products containing excessive amounts of water; which have inadequate storage stability due to poor bacteriostatic properties; and require the utilization of expensive protein source materials (meat).

SUMMARY OF THE INVENTION

The present invention relates to a method of producing an intermediate moisture food product that resists spoilage and is shelf stable at ordinary room temperatures, said product having a moisture content between about 20 and 35% by weight, a protein content between about 20 and 35% by weight, a water activity between about 0.80 and 0.85, and a bulk density between about 20 and 30 pounds per cubic foot, which method comprises:

a. forming an admixture of dry solid components, including from about 15 to 35% by weight of a cereal grain and from about 20 to 70% by weight of protein source material, flavorants, vitamins, trace minerals, salt and an antimycotic agent, which are all reduced to a particle size of less than No. 6, U. S. mesh screen sieve;

b. adding from about 5 to 15% by weight of a polyhydroxy alcohol bacteriostatic agent and forming a uniform blend thereof with the dry ingredients;

c. admixing from about 1 to about 10% by weight of comminuted fresh meat to the blend of dry ingredients and polyhydroxy alcohol;

d. passing the blended admixture in a confined stream through a cooking zone wherein the blended ingredients are vigorously agitated and the moisture content and temperature thereof are increased by injecting hot water and steam into the agitated mix to produce a hot, moist granular mix;

e. passing the heated, moist granular mix to an extrusion zone wherein the mix is subjected to agitation and maintained at pressures above atmospheric pressure and temperatures above the boiling point of water for a time sufficient to cook the admixture to a non-granular, fused state;

f. extruding the cooked, fused admixture from the extrusion zone through a restricted orifice to a zone of reduced pressure to form self-expanding, rope-like extrudate;

g. cutting the rope-like extrudate into uniform sections to form pellets therefrom;

h. subjecting the pellets to tumbling while spraying the pellets with a finely divided water stream and cold air to reduce their temperature to below about 100° F. and increase the moisture content thereof to a pre-determined level; and i. coating the pellets with a liquefied edible fat to raise the fat content to a pre-determined level of at least 7%.

The process of the invention produces a shelf stable, intermediate moisture food product which has acceptable taste, texture and color, is high in protein and provides a balanced diet from a nutritional point of view. The product is especially useful as a pet food. It is superior to the traditional dry expanded dog foods which are hard, dry, tough and costly to produce by virtue of the expense of drying to low moisture levels, i.e., 10%.

Accordingly, it is an object of this invention to provide a novel process for the production of an intermediate moisture food product which employs cereal grains and a high proportion of vegetable proteins.

It is a further object to provide a process for producing a soft, intermediate moisture food product which is resistant to deterioration by bacteria, yeast and mold when stored under ordinary room temperature conditions and does not require canning or refrigeration.

It is another object of this invention to provide a process for producing an intermediate moisture food product at low costs which exhibits flexibility in choice of constituent materials over those processes taught in the prior art while maintaining the desired nutritional level.

It is an additional object of this invention to provide a process for producing an intermediate moisture food product which provides good control of the total moisture content, fat content, odor and color of the product.

Finally, it is an object of this invention to provide a novel intermediate moisture food product.

BRIEF DESCRIPTION OF THE DRAWINGS

For a more complete understanding of this invention, reference is made to the accompanying drawing which illustrates in schematic flow sheet form the process of this invention.

DESCRIPTION OF THE PREFERRED EMBODIMENTS

In accordance with the invention, there is provided a process for the production of an intermediate moisture food product generally illustrated schematically in the accompanying drawing. The initial steps in the process comprise grinding and mixing of cereal grains and dry protein source materials, including those selected from the group consisting of vegetable protein such as soy protein, corn gluten, cottonseed meal, peanut meal, as well as proteinaceous by-product meat and poultry meal materials, and mixtures thereof.

The cereal grain material may comprise any common grain such as corn, wheat, oats, rye, etc. Corn meal is a preferred cereal grain material for use herein, as it is both abundant and inexpensive. Sufficient cereal grains should be employed so that the resulting final product as used or sold contains from about 15 to about 25% by weight of cereal grain, preferably from about 17 to about 22% by weight.

The protein source materials used herein include primary protein sources such as meat, fish and fowl, and "secondary protein sources" which include vegetable protein materials and microbial protein such as single cell protein (yeasts). It is preferred to utilize a mixture of primary and secondary protein source materials in this method or process, particularly a mixture of secondary or vegetable protein source materials as the major principal protein component and a minor amount of primary protein sources such as meat or meat by-product meals. Such protein-containing materials should be employed in quantities so that the final resulting product contains (on a wet basis) from about 20 to about 35% by weight protein, preferably from 20 to 30% protein.

Proteinaceous by-product materials may include low moisture, dry meals containing the by-products from the processing of meat, poultry and fish, including bones and waste tissues.

Vegetable protein source materials include meals derived from proteinaceous seed meals and protein (e.g., soy) concentrates and isolates made from soybeans, peanuts, peas, sunflower seeds, cottonseed, coconut, rapeseed and sesame seed. High protein fractions from certain cereals may be used as and are included as secondary protein sources such as wheat gluten, corn gluten and corn zein. It is preferred that oil seed derived materials be employed in defatted condition, e.g., as isolated soy protein, defatted soy grits, including textured vegetable proteins, and defatted cottonseed, sesame seed and peanut meals.

The required amounts of cereal grain and dry protein source materials are combined and ground or may be ground prior to combining. The ingredients are then mixed, preferably by utilizing batch mixing apparatus of the type well known in the art.

The ground dry ingredients should be in a uniform granular form having a particle size which facilitates uniform mixing and cooking in later processing steps. Such reduction is effectuated by grinding the grain and protein sources in grinding apparatus well known to the art, such as a hammer mill grinder. The product is preferably passed through a Number 6 screen and most preferably through a U.S. Number 10 mesh screen.

After the addition of such food additives, a polyhydroxy alcohol bacteriostatic agent is added to the mix in the ribbon blender while agitation is continued. The polyhydroxy alcohol is a non-saccharide material, namely a material which does not comprise a sugar or saccharide. The preferred low molecular weight bacteriostatic agent found useful in this invention is propylene glycol, but glycerol or mixtures of propylene glycol and glycerol can also be used, but are less preferred.

The ground cereal grain and dry protein sources are blended with the dry powdered materials such as salt, antimycotic agent, color(s), flavor(s), vitamins, trace minerals and dry emulsifiers, preferably in a ribbon blender. Preferred antimycotic agents or compounds are sorbic acid and its salts, potassium sorbate being particularly useful and the preferred antimycotic for use in this process. Sufficient antimycotic compound is utilized such that the resulting product contains from about 0.1 to about 0.5% by weight on an overall wet basis. Where potassium sorbate is utilized as the antimycotic compound, it is preferred that an amount sufficient to provide a final product content of from amount 0.2 to about 0.4% by weight be used. The bacteriostatic agent is added to the ground mix with agitation in the ribbon blender.

To the resulting blend, an emulsion of meat or meat by-products is added and blended into the ground dry mix with further agitation so as to result in a relatively homogeneous composition. The meat emulsion prepared by any of the techniques known to the art, such as grinding, is added directly to the mix without undergoing any prior or separate pasteurization operation. The quantity of meat used in the process is from about 1 to about 10% by weight thereof, preferably from about 2 to 8% by weight on an as is, full moisture, final product basis.

The blender mix of the dry ingredients, bacteriostatic and antimycotic agents, and the meat emulsion is transferred to a pre-cooker zone. The pre-cooking step includes injecting wet, low pressure steam, or a mixture of steam and water, into the mix while maintaining vigorous agitation. Sufficient steam is injected to raise the temperature to from about 180° to about 190° F. The amount of steam and hot water injected increases the moisture content of the mix to about 20%. It should be noted that when the mix leaves the pre-cooker zone the ingredients are not fused, but are in a hot, wet, granular state. The pre-cooking step does not involve the use of superatmospheric pressure.

The mix from the pre-cooker is then passed to a screw-type extruder zone, exemplified by a Wenger extruder, where additional heat is supplied to the mix by means of a heat jacket or the extruder chamber or zone barrel. The compression and supplemental extruder barrel jacket heat raises the temperature of the mix to a point sufficient to cook and fuse the mixture. A product temperature between about 220° and 230° F. is attained, with extruder zone pressures of between 150 and 165 psia.

The cooked, fused mix is then forced through a die or orifice, or a plurality of die orifices, into a zone of lower pressure, i.e., atmospheric pressure. The resulting rope-like extrudate from the die expands or puffs when it leaves the die orifice and high superatmospheric pressure of the extruder zone to approximately twice its die diameter. The expanded extrudate is then cut at the die face into uniform segments by a rotating knife, forming pellets of relatively uniform size. The expansion of the extrudate from conversion of superheated moisture results in the loss of water in the form of steam and a consequent loss of moisture in the product.

The pellets after extrusion are relatively soft and hot (about 190° F.). To cool the pellets and to increase the final moisture content of the product, the pellets are sprayed with a fine mist of water and exposed to a stream of cool air, while being simultaneously tumbled in a pan coater. The cooling water may also contain a flavoring, such as garlic and/or smoke flavor. By varying the amount of water sprayed on the pellets, as well as the time of application, the final water content of the pellets can be closely controlled.

The cooled pellets, at a temperature of below about 100° F., are then coated with an edible fat to enhance the taste and nutritional value. This fat coating may be food grade oil or fat, such as soybean oil, cottonseed oil or tallow, and is used in amounts so that the final fat content of the pellets is at least 7%.

It should be understood that the cooling of the pellets by the use of a water mist and a stream of cool air is, in effect, a quenching step which stops lag-cooking of the hot product, hardens the pellets and supplements the moisture already present in the pellets. Generally, it is desired that the moisture of the pellets be between 20 and 35%, preferably between 25 and 30%. The cooling step, with its water spray treatment, should not be carried out so rapidly as to cause the surface of the pellets to become soggy and sufficient time should be allowed for the water to migrate from the surface of the pellet toward its center.

The quenching step also minimizes "off" odors and flavors and improves color, as well as preventing overcooking and hardening or denaturization of the surfaces.

When most of the surface water has migrated into the quenched pellets, the pellet surface is then receptive to the fat coating treatment.

The coating of the pellet surfaces with fat is carried out in a pan coater. It is necessary that the time between the fat coating step and packaging be such that prior to packaging, the pellets do not show any surface liquid, either fat or water.

The addition of supplemental fat to the pellet has been found to be necessary since the desired total fat content of the product is difficult to incorporate into the mix before extrusion and still produce properly expanded pellets at the extruder die head. The final product most desirably contains at least about 7% fat and may range upwards to as high as 9 or 10% fat, and the fat coating step is used to bring the total fat content up to the predetermined level selected.

The following specific example will illustrate the process of the invention and the intermediate moisture food product produced thereby.

EXAMPLE

The following ingredients are blended for a period of about five minutes in a batch mixer:

| Ingredients | Pounds |
| --- | --- |
| Yellow Corn | 960 |
| 44% Protein Soy Meal | 912 |
| 21% Protein Corn Gluten | 480 |
| Dry Meat Scraps | 298 |
| 62% Protein Poultry Meal | 144 |
| 41% Protein Corn Gluten | 330 |
| Total | 3,114 |

The blended ingredients in the mix are then ground in a Hammer Mill Grinder to pass through a Number 6 screen, and the ground mix placed in a two-ton ribbon blender and blended with the following powdered ingredients:

| Ingredients | Pounds |
| --- | --- |
| Salt | 48.0 |
| Flavoring | 7.2 |
| Coloring | 1.44 |
| Powdered potassium sorbate | 14.4 |
| Vitamins (powdered) | 4.8 |
| Trace minerals (powdered) | 4.8 |
| Mono-diglyceride (powdered) | 14.4 |
| Total | 95.04 |

Blending is continued until the ingredients are a substantially uniform and homogeneous admixture, and 480 pounds of propylene glycol and 240 pounds of emulsified fresh frozen meat are added to the blend with further mixing for an additional period of about 15 minutes. The blended ingredients in the essentially dry mixture are at room temperature and have a moisture content of about 14%. The blend is fed at a predetermined rate into a pre-cooker section of a Wenger X-25 extruder, the pre-cooker is in a confined stream form comprising in this embodiment a tubular chamber having a central axial mixer and provision for injection of hot water and steam adjacent the feed portion of the chamber. The blended ingredients in the pre-cooker are mixed vigorously and at the same time the moisture content of the mix is increased to about 24 to about 26% and the temperature to 180°– ° F. by the injection of wet, low pressure steam and hot water. The mixing in the pre-cooker zone is carried out under essentially atmospheric pressure conditions.

The wet, hot, granular effluent from the pre-cooker is then fed into the Wenger extruder chamber or barrel containing an axial drive screw or compression feed auger, where it is subjected to compression and resultant pressures above atmospheric pressure and the temperature is increased to about 225°– ° F. During the extrusion, some heat is generated by the compression of the product in the extruder chamber and this may be supplemented by heat transfer from an external (steam) heated jacket surrounding the barrel or extrusion chamber. While the wet, granular product is in the extruder chamber it undergoes cooking under pressure resulting in a fused, cooked mass. Immediately prior to actual extrusion through the die the fused product has a temperature of about 230° F. and is under a pressure of from 150 to 165 psia.

The die in one preferred embodiment is provided with four round orifices having a diameter of about ¼ inch. After the cooked, fused product passes through the die orifice(s) and is exposed to reduced (normal) atmospheric pressure, the rope-like extrudate expands to a diameter of about ½ inch, with some of the superheated moisture in the product previously at superatmospheric pressures immediately converting to steam, with a consequent reduction in the overall moisture content of the product, as well as cooling to about 200° F. by virtue of the expansion and flashing-off of a part of the water. A rotating knife positioned at the exit or outer surface of the die face cuts the rope-like into uniform sections as it passes from the die orifice. These are generally about ½ inch in length and, as indicated, the expanded pellets have a diameter of about ½ inch. While the pellets thus produced have structural integrity, they are still quite soft and easily deformed by handling. Since they are at an elevated temperature, cooking continues unless they are immediately cooled. To prevent further cooking of the pellets, they are transferred to a continuous pan coater where they are contacted with a fine mist or spray of 60° F. water and a stream of cold air. In this cooling operation, the pellets' internal temperature is further reduced from about 200° F. to about 100° F. and at the same time the moisture content is raised from about 22% to about 26 to about 28%, or more, by weight. The tumbling in the pan coater during the cooling step permits the spray or mist to be applied relatively uniformly to the surfaces of the pellets for even cooling. The cooled pellets, at about 100° F., are transferred on a conveyor to a second pan coater where the cooled pellets are coated with liquefied fat (tallow), applied in an amount sufficient to increase the fat content of the pellets to the desired level, usually adding about 3% fat. The time lapse between the cooling operation and the fat coating operation is about 15 minutes, and in any event, may be adjusted so as to permit the surface moisture to penetrate into the pellet so that the pellets do not exhibit surface wetness at the time that they enter the pan coater for the fat application.

After the pellets are coated with fat in the pan coater, they are transferred to a packaging machine, again with sufficient time lapse to permit the applied fat coating on the surface to both penetrate into the pellet and also to congeal. The pellets have a surface essentially free of liquid fat prior to packaging. The pellets are then placed in moisture-proof packages and stored.

The product produced in the foregoing example has the following characteristics and properties:

| | |
|---|---|
| Protein | 20% |
| Crude Fiber | 3% |
| Ash | 7.5% |
| Moisture | 28% |
| Fat | 7% |
| Bulk Density | 25 lbs/ft$^3$ |
| Color | Reddish Brown |
| Water Activity | 0.84 |

While the foregoing example illustrates one preferred embodiment of the process of the present invention, it is also to be understood that other modifications and variations in the method may be employed without departing from the basic scope and concept of the invention. For example, in a further preferred embodiment it was found that in certain instances where the cereal grain component did not provide the requisite binding properties, a binder such as carboxymethyl cellulose in amounts of about ½ to 1% by weight provided a satisfactory binding effect. Similarly, a variety of other cereal grains and protein source materials may be employed in the method and minor adjustments made in the process conditions, including blending times, temperatures and pressures of pre-cooking and extrusion, modification of flavor, water activity or the like.

The product of the process described herein is a low bulk density food which has good shelf stability, being resistant to bacterial decomposition by virtue of its low water activity or spoilage by mold or fungus by virtue of the antimycotic agent. The product is highly nutritional and demonstrates good acceptance by pets such as dogs, cats, or the like. In some instances, the end use of the product for certain animals may require modification such as enhancing the protein content at least 30% and adding an edible acid, such as phosphoric, to produce a product with an acid taste and a pH from about 4.5 to 5.0 when formulated as a cat food.

Variations of the product bulk density may be achieved by modifying the temperatures and pressures of extrusion to regulate the puffing or expansion of the extrudate.

Other modifications of the process may be carried out by those skilled in the art which result in variations of color, texture, flavor or nutritional balance.

What is claimed is:

1. A method of producing an intermediate moisture food product that resists spoilage and is shelf stable at ordinary room temperatures, having a moisture content between about 20 and 35% by weight, a protein content between about 20 and 35% by weight, a water activity between about 0.80 and 0.85, and a bulk density between about 20 and 30 pounds per cubic foot, which method comprises:
   a. forming a dry admixture of dry solid components, including from about 15 to 35% by weight of a cereal grain, and from about 20 to 70% by weight of a protein source material, an antimycotic agent and other dry additives reduced to a particle size less than Number 6 mesh, U.S. screen seive;
   b. adding from about 5 to 15% by weight of a polyhydroxy alcohol bacteriostatic agent and forming a uniform blend thereof with the dry ingredients;
   c. admixing from about 1 to about 10% by weight of comminuted fresh meat to the blend of dry ingredients and polyhydroxy alcohol;

d. passing the blended admixture in a confined stream through a precooking zone wherein the blended ingredients are vigorously agitated and the moisture content and temperature thereof are increased by injecting hot water and steam into the agitated mix to produce a hot, moist, essentially unfused granular mix;

e. passing the heated, moist granular mix to an extrusion zone wherein the mix is subjected to compressive agitation and pressures above atmospheric pressure and temperatures above the boiling point of water for a time sufficient to cook the admixture to an essentially nongranular, fused, self-sustaining, cohesive state;

f. extruding the cooked, fused admixture from the extrusion zone through a restricted orifice to a zone of reduced pressure to form self-expanding, rope-like extrudate;

g. cutting the rope-like extrudate into uniform sections to form pellets therefrom;

h. subjecting the pellets to tumbling while spraying the pellets with a finely divided water stream and cold air to reduce their temperature to below about 100° F. and increase the moisture content thereof to a pre-determined level; and i. coating the pellets with a liquefied edible fat to raise the total fat content of the pellets to at least 7%.

2. A method according to claim 1 wherein the cereal grain is selected from the group consisting of corn, wheat, oats, rye and rice, and mixtures thereof.

3. A method according to claim 1 wherein the dry protein source materials are selected from the group consisting of vegetable protein, single cell protein and meat, poultry and fish meals.

4. A method according to claim 1 wherein the blended mixture fed to the pre-cooker zone has a fat content of less than 5% by weight.

5. A method according to claim 1 wherein the water soluble polyhydroxy alcohol bacteriostatic material is selected from the group consisting of propylene glycol, and mixtures of propylene glycol and glycerol.

6. A method according to claim 1 wherein the antimycotic compound is selected from the group consisting of sorbic acid and its non-toxic alkali metal salts.

7. A method according to claim 1 wherein the antimycotic compound is potassium sorbate.

8. A method according to claim 1 wherein the water-soluble bacteriostatic material is propylene gylcol.

9. A method according to claim 1 wherein said blended mix is heated in the pre-cooker to a temperature of above about 180° F. and the moisture content is increased to above 25% by treatment of the blend in the pre-cooker zone with hot water and steam.

10. A method according to claim 1 wherein said extrusion is carried out at a temperature of from about 220° to about 230° F. to effectuate cooking and fusion of the product.

11. A method according to claim 1 wherein the extrusion is carried out under pressures of from about 150 to 165 psia.

12. A method according to claim 1 wherein the extrudate has a temperature of above about 200° F.

13. A method according to claim 1 wherein the dry additives blended with the cereal grain and protein source material are trace minerals, vitamins, coloring, thickeners and flavoring agents.

14. A method according to claim 13 wherein the protein source materials are an admixture of a minor proportion of primary protein source materials and a major proportion of secondary protein source materials.

15. A method according to claim 14 wherein the primary protein source materials are selected from the group consisting of fresh meat, meat meal, poultry meal, fish meal, and mixtures thereof.

16. A method according to claim 1 wherein the dry protein source materials are secondary protein sources selected from the group consisting of defatted soybean meal, and concentrates thereof, and gluten.

17. A method according to claim 1 wherein said blended mix is heated to a temperature of from about 180° to about 190° F. in the pre-cooking zone at essentially atmospheric pressure and heated to a temperature of from about 220° to 230° F. at pressures of from about 150 to 165 psia in the extrusion zone.

18. The product of the process of claim 1.

19. A process according to claim 1 which comprises forming an admixture of corn meal, defatted, dehulled soybean meal, dried meat and poultry meal and corn gluten; grinding the blend to pass through a Number 6 mesh U.S. seive series screen; admixing the ground blend with salt, flavors, coloring, potassium sorbate, vitamins, trace minerals, and mono-diglycerides, all in a form to pass through a Number 6 mesh screen; admixing propylene glycol and emulsified fresh meat with the ground blended mix; passing the resulting mixture through a pre-cooker zone where the mixture is agitated and heated with injected steam and hot water to raise the temperature to at least 180° F. and the moisture content to from about 24 to 26% and produce a wet, granular, essentially unfused admixture; passing the admixture to an extruder zone wherein the admixture is cooked and fused at a temperature between about 220° and 230° F. and pressures of about 150 to 165 psia; extruding the fused, cooked admixture through a die to a zone maintained at atmospheric pressure to form a self-expanding, rope-like extrudate, cutting the hot rope-like extrudate into uniform sections to form uniform expanded pellets therefrom having a temperature of about 220° F.; subjecting the hot pellets to tumbling while spraying the pellets with a finely divided water spray mist and a cold air stream to concomitantly reduce their temperature to below about 100° F. and increase the moisture content thereof to a level of from about 26 to 30%; and coating the cooled pellets with liquefied fat to increase the fat content to at least about 7% by weight.

* * * * *

UNITED STATES PATENT AND TRADEMARK OFFICE
CERTIFICATE OF CORRECTION

PATENT NO. : 4,022,915
DATED : May 10, 1977
INVENTOR(S) : HAROLD ZUKERMAN

It is certified that error appears in the above-identified patent and that said Letters Patent are hereby corrected as shown below:

Col. 6, l. 65 — After "180-" insert -- 190 --

Col. 7, l. 6 — After "225-" insert -- 230 --

Col. 10, l. 51 — "220" should be -- 200 --
CLAIM 19

*Signed and Sealed this*

*Thirteenth* Day of *December 1977*

[SEAL]

Attest:

RUTH C. MASON
*Attesting Officer*

LUTRELLE F. PARKER
*Acting Commissioner of Patents and Trademarks*